(No Model.) 2 Sheets—Sheet 1.
A. H. WHITING.
POLARITY SWITCH FOR SECONDARY BATTERY SYSTEMS.
No. 508,069. Patented Nov. 7, 1893.
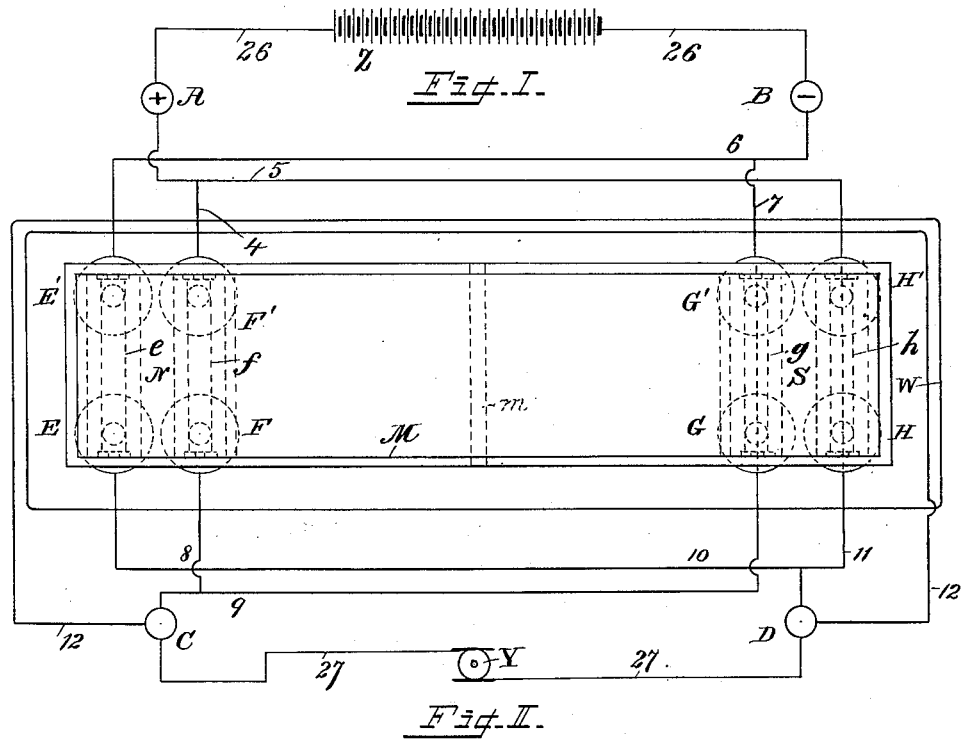
Fig. I.
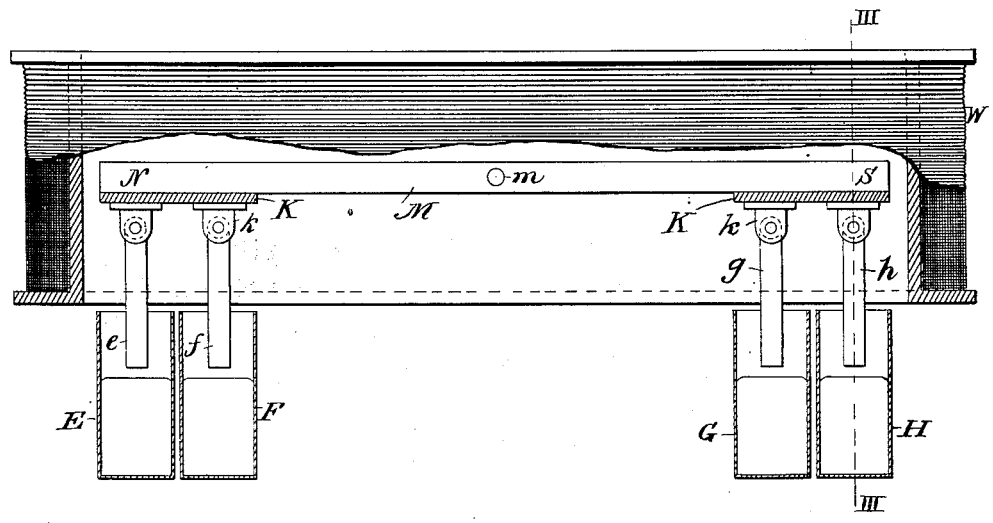
Fig. II.
Attest
A. A. Erb.
Reed Lewis
Inventor:
Allen Hart Whiting
by Pollok & Mauro
his attorneys (No Model.) 2 Sheets—Sheet 2.
A. H. WHITING.
POLARITY SWITCH FOR SECONDARY BATTERY SYSTEMS.
No. 508,069. Patented Nov. 7, 1893.
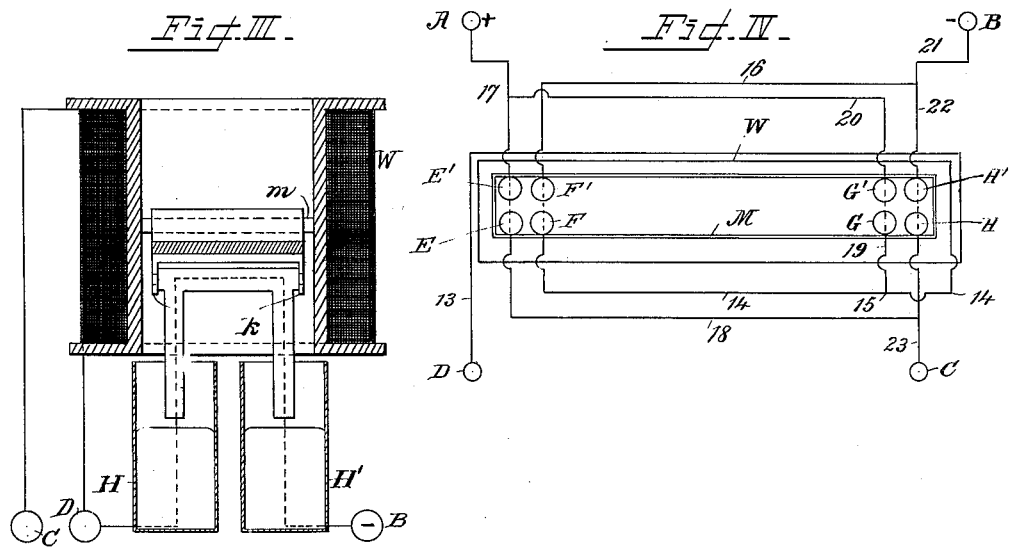
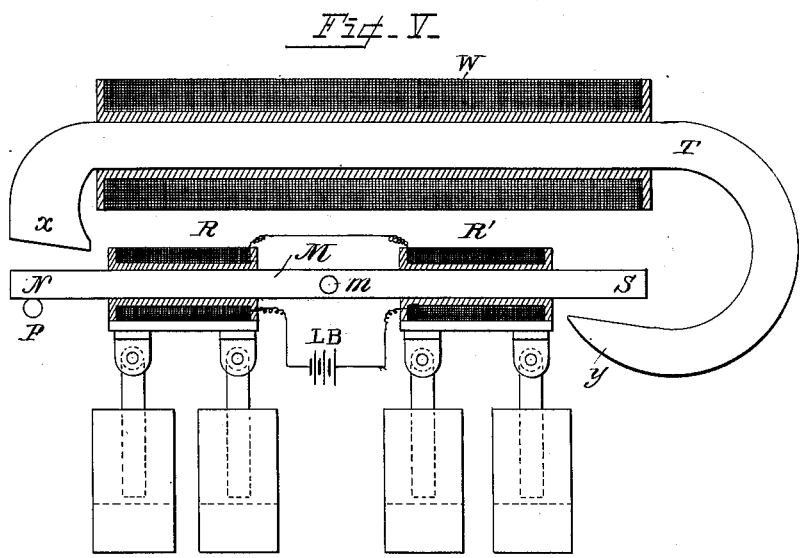
Attest:
A. A. Erb.
[signature]
Inventor:
Allen Hart Whiting
by [signature]
his attorneys.

UNITED STATES PATENT OFFICE.

ALLEN HART WHITING, OF NEW YORK, N. Y.

POLARITY-SWITCH FOR SECONDARY-BATTERY SYSTEMS.

SPECIFICATION forming part of Letters Patent No. 508,069, dated November 7, 1893.

Application filed June 1, 1893. Serial No. 476,204. (No model.)

*To all whom it may concern:*

Be it known that I, ALLEN HART WHITING, of New York city, New York, have invented a new and useful Improvement in Polarity-Switches for Secondary-Battery Systems, which is fully set forth in the following specification.

This invention has reference to automatic switching devices for use particularly in connection with storage batteries, the object being to insure the proper connection of the batteries with the supply or charging circuit when the latter is connected to the battery main for the purpose of charging the batteries. In making connections for such purpose the attendant or workman (particularly if unskilled in electrical matters) is liable through carelessness or ignorance to connect the positive lead of the charging main to the negative terminal or binding post of the battery circuit. With a switch of the kind herein described it is immaterial to which of the terminals the positive lead or conductor is attached, the result in either case being to complete a circuit through the batteries in the proper direction. The general arrangement of the appliances which I have devised for this purpose is as follows: The terminals, to which the main charging conductors are to be attached, have each two branch wires, one leading to the positive and the other to the negative conductor of the group of batteries; or conversely stated, each conductor of the battery circuit has two branches, one leading to each of the terminals. These branches are controlled by a polarity-switch which in turn is actuated by a magnet or coil included in a shunt connecting the two terminals. When a circuit is completed through the shunt the polarity-switch is called into action and closes one pair or the other of the connection branches according to the direction of the current through the actuating coil. The direction of the current in the controlling coil acts upon the switching devices in such manner as to connect always the plus pole of the battery with that terminal of the charging main to which the plus conductor is attached. It is obviously preferable to have this coil in a shunt so that it will carry only a portion of the charging current; but when the latter is an arc-light circuit, in which all the translating devices are in series, it is necessary to employ a coil of wire of sufficiently large capacity to carry the entire current, and to connect this coil with the charging main terminals and battery terminals in series. The polarized or magnetic bar which is acted upon by the controlling coil, and makes one set of connections or another according to connection of the charging circuit conductors, may be either a permanent magnet or an electromagnet.

The invention may be carried out in various ways. In the apparatus as hereinafter described I employ for the switching devices mercury cups, and rods adapted to dip into the mercury in said cups, the rods being carried by a rocking magnet (either permanent or an electro-magnet) controlled by a coil as above stated; but the switch may be of the commutator type or of other suitable form, since it will be obvious to persons skilled in the electrical art that modifications of detail may be made without departing from the spirit of the invention.

In the accompanying drawings:—Figure I is a plan view of one form of mechanism constructed in accordance with the invention. Fig. II, is a side elevation of the same with part of the actuating coil broken away. Fig. III is a transverse section on line III. Fig. IV is a diagram illustrating a controlling coil connected in series, and Fig. V is a sectional elevation of a modified form of switch in which an electro-magnetic switch is employed.

In Figs. I to III A represents the positive and B the negative binding post of the circuit 26 which contains the secondary batteries Z. C and D present the binding posts to which the conductors 27 of the charging dynamo Y (Fig. 1) are connected when the batteries are to be charged. They are normally disconnected from the battery circuit. Connections between the charging main and the battery are effected through mercury cups of which there are four pairs, designated respectively E E′, F F′, G G′, and H H′. The plus pole A of the battery circuit is connected by a wire 4 with cup F′ and by a wire 5 with cup H′. The minus pole B is connected by wires 6 and 7 with cups E′ and G′ respectively. Binding post C is connected by wires 8 and 9 with cups F and G respectively, and post D by wires 10 and 11 with cups E and H respectively.

M represents a permanent magnet in the form of a rectangular frame, centrally pivoted at m and balanced so as to maintain normally a horizontal position. This magnet has at its north end N two U shaped copper contact-bars or bridge-pieces e, f, and at its south end S two similar contact bars g, h. These contact pieces are swiveled in brackets k attached to insulating plates K. All the contact-pieces are normally out of contact with the mercury in the cups beneath.

W represents a coil surrounding magnet M, this coil being connected in a shunt 12 Fig. I across the main line connection posts C, D.

The operation of the apparatus will be readily understood. If the attendant in making connection with the charging circuit connects the plus pole of the latter to post C, a current flows through the shunt 12 and coil W from that post to post D, and the N-end of magnet M will be deflected downward thus closing a circuit across the cups E E', F F' and connecting the batteries in the charging main. This completed circuit will proceed from post C by wire 8, cups F F' and wire to the plus pole A of the batteries, through the latter and back by post B, wire 6, cups E' E, and wire 10 to the post D. If, on the other hand, the attendant connects the plus conductor of the charging circuit to the post D, the current through coil W will be in the opposite direction to that first supposed, deflecting downward the S-end of magnet M. Post D will now be connected with the plus pole A of the battery circuit by wire 11, cups H H', and wire 5, and post C with the minus pole of the battery circuit by wire 9, cups G G' and wire 7.

In Fig. IV the controlling coil W is shown as connected in series with the charging line. In this case there must always be a connection through the switching apparatus from one terminal (C) to the other (D). Therefore the bar M is made heavier at one end (say N) than at the other, so that the branches through cups E E', F F' are normally closed. When the charging mains are connected to the terminals C, D, a circuit will be made as follows: from terminal D by wire 13 to coil W, by wire 14, cups F F', wires 16 and 21, to minus terminal B of the batteries, returning thence by wire 17, cups E' E and wire 18 to terminal C. If the minus conductor of the charging main has been connected to terminal D and the positive to terminal C, this circuit will remain during the charging of the batteries. If, however, the connections be reversed, the plus conductor being connected to terminal D the bar M will shift, depressing end S. In this movement the circuit of the coil and batteries will be momentarily broken, but the momentum of the bar will complete the movement and make connections at the S end through cups G G', H H', the circuit being from terminal D by wire 13 through the coil W and wire 14, as before to the point 15, where wire 14 branches; thence by wire 19, cups G G', wires 20 and 17 to plus terminal A; returning from terminal B by wires 21, 22, cups H' H, and wire 23 to the terminal C.

As shown in Fig. V the rocking bar M' may be polarized by electro-magnetism, through the coils R R', which as shown are excited from a separate battery L B (though the main batteries, or a portion thereof may be utilized for that purpose). Coil W is in this case wound around a bar magnet T of the form shown. Bar M' normally has its N-end depressed, resting as shown against stop P. If the current passes through coil W in such direction as to make the end X of magnet T a north-pole, it will repel the adjacent N-pole of magnet M', preserving the position indicated in the drawings. If the current passes in the opposite direction the adjacent poles of the two magnets will be of unlike sign and consequently will attract each other, depressing the S-end of the magnet M'.

Other modifications will be obvious to persons skilled in the electrical art.

Having thus described my invention, what I claim as new, and desire to secure by Letters Patent, is—

1. The combination with a secondary battery circuit, and the connection-terminals for a main line or charging circuit, of automatic polarity switch-mechanism between the battery circuit and main line terminals for connecting either of said terminals with either pole of the battery circuit, said switch-mechanism comprising a pivoted polarized bar having contact devices at each end and an actuating magnet for said switch mechanism having its coil in a circuit from one main line terminal to the other, substantially as described.

2. The combination with two electric circuits adapted for connection to make a complete circuit, of polarity switching devices between the terminals of the respective circuits, said switching devices comprising a pivoted bar having contacts at both ends with cooperating contacts in the said circuits and a magnet actuating said polarity switching devices, said magnet being in a shunt across the terminals of one circuit substantially as and for the purpose set forth.

3. The combination with a secondary battery circuit, and connection terminals for a main or charging circuit, of a polarity switch comprising a polarized bar pivoted in a suitable support and having contacts or circuit closers at each end, each having cooperating stationary contacts and an exciting coil for said bar connected across the main line terminals, substantially as described.

4. The combination with terminals to which the conductors of a supply circuit may be connected, of a polarity switch comprising a pivoted permanent magnet having at each end circuit-closing devices for connecting wires leading from said terminals to contacts contiguous to both ends of said bar, and a coil surrounding said magnet and connected across said terminals so as to tilt the magnet in one
5 direction or the other according to the direction of the current in said circuit, substantially as described.

In testimony whereof I have signed this specification in the presence of two subscribing witnesses.

ALLEN HART WHITING.

Witnesses:
RAY R. HILLMAN,
GEO. CASS HUTCHINSON.